United States Patent [19]

Pimpinella

[11] Patent Number: 5,123,073
[45] Date of Patent: Jun. 16, 1992

[54] PRECISION OPTICAL FIBER CONNECTOR

[75] Inventor: Richard J. Pimpinella, Hampton, N.J.

[73] Assignee: AT&T Bell Laboratories, Murray Hill, N.J.

[21] Appl. No.: 708,646

[22] Filed: May 31, 1991

[51] Int. Cl.$^5$ .......................... G02B 7/26; G02B 6/26
[52] U.S. Cl. .......................................... 385/59; 385/73
[58] Field of Search ..... 350/96.15, 96.18, 96.20–96.22

[56] References Cited

U.S. PATENT DOCUMENTS

| | | | |
|---|---|---|---|
| 4,468,087 | 8/1984 | Milan et al. | 350/96.21 |
| 4,732,449 | 3/1988 | Fan | 350/96.18 |
| 4,781,431 | 11/1988 | Wesson et al. | 350/96.21 |
| 4,889,406 | 12/1989 | Sezerman | 350/96.18 |
| 4,900,118 | 2/1990 | Yanagawa et al. | 350/96.21 |
| 4,911,523 | 3/1990 | Sondergeld et al. | 350/96.21 |
| 4,989,940 | 2/1991 | Wollenweber et al. | 350/96.18 |

*Primary Examiner*—Akm Ullah
*Attorney, Agent, or Firm*—C. E. Graves

[57] ABSTRACT

This disclosure describes a precision optical fiber connection system buildable with a minimum of precision-made components. Sets of fibers to be mated are contained in V-grooves in respective opposing silicon-etched fiber holders. A lense-sphere is fixedly deployed in the groove next to the end of each fiber. An initial gross positioning of the lense-spheres of the upper fiber holders with respect to their receiving grooves in the lower fiber holder, is achieved by using a cylinder disposed adjacent to the fiber grooves. Tapered sides of the upper holders engage the cylinder to funnel the lense-sphere into their receiving grooves. Also disclosed is a three-point support system for assuring that the opposing fiber groove surfaces remain parallel and do not experience relative rotation.

10 Claims, 9 Drawing Sheets

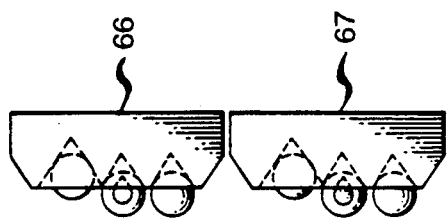
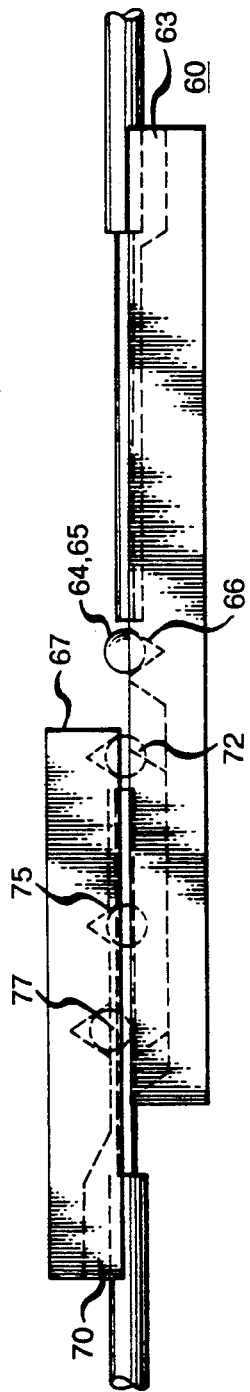
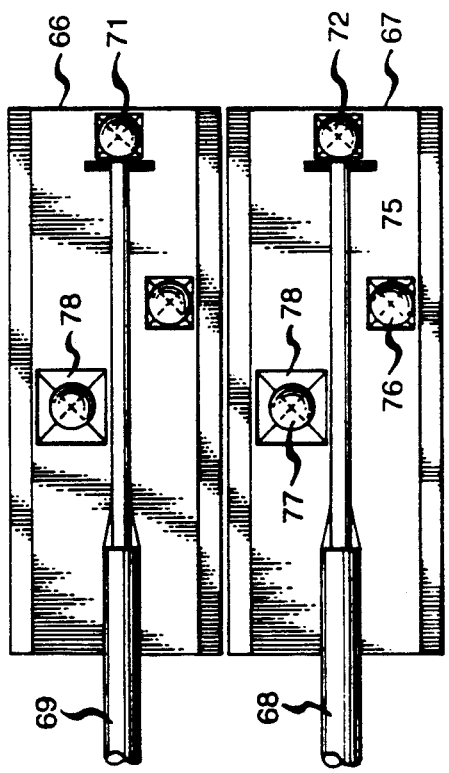

PRECISION OPTICAL FIBER CONNECTOR

FIELD OF THE INVENTION

This invention relates to optical fiber connectors and, more particularly, to a multi-purpose optical fiber connector that provides precise fiber-end alignment in 3-dimensional space using few and inexpensive precision components.

BACKGROUND OF THE INVENTION

In applicant's prior patent application (Ser. No. 07/608,102, filed Oct. 31, 1990 is allowed) there is described an optical fiber connector in which two sets of optical fiber ends to be connected are contained in opposing V-grooves formed on plates contained in the respective interiors of first (left) and second (right) mating housings. Doors to the interior space are maintained in a normally closed position to seal the fiber ends from particulate matter. Mechanisms are provided on each half which actuate surface features of the other housing during mating engagement to open the access doors to the housing interiors. Thus, the doors unseal only when the housings are mated.

The mechanisms for aligning the fibers include upper and lower fiber-holding plates or substrates integrally fixed in the respective housings. The plates have fiber-receiving grooves. Each groove also contains an alignment sphere, fixed in location with respect to the fiber end, with the end and sphere spaced apart. The sphere center locates in the groove in line with the fiber core axis.

The opposing V-grooves of the plates are congruent in the sense that the corresponding grooves of the two plates are located within the same inter-groove spacing. As the two housings engage, an actuator slidably mounted in the left housing is moved inwardly by contact with the right housing. This allows the fiber substrate in the left housing to pivot downward, with its associated sphere and fiber assembly coming to rest in the corresponding alignment groove formed in the floor of the right housing. With the ball and fiber of the right housing positioned in their respective alignment grooves, the fiber ends come to rest in the desired axial alignment. The alignment spheres, besides providing precision axial alignment of the two fibers, also provide efficient focusing of the light emitted from the fiber ends through the spheres.

In realizing optical fiber connections pursuant to applicant's prior patent application, the precision required to effectively align the fiber ends and their associated alignment/focusing spheres in the manner summarized above, is achieved largely by building precision into the right and left housing members and their moving components. While fully functional from a technical standpoint, achieving the needed precision in this manner adds expense to the connector. The expense of achieving precision mounts dramatically when the inventive concept is applied to gang-connection of a multiplicity of optical fibers in a backplane.

Achieving the needed precision in the end-to-end connection of one or more pairs of optical fibers is not, however, a problem peculiar only to the gang-type sealed connector described in applicant's prior patent application. The generic problem is to devise a mechanism for realizing highly accurate and reliable fiber end alignment which can be constructed inexpensively, used readily by any skill level, and is durable under most operating conditions.

OBJECTS OF THE INVENTION

Accordingly, a broad object of the invention is to connect one or more pairs of optical fibers quickly and reliably and in precise and stable coaxial alignment.

Another object of the invention is to decrease the cost of gang-type optical fiber connectors and at the same time assure the needed precise and stable coaxial alignment.

A general object of the invention is to provide a system for the connection of optical fiber which assures uniform and precise fiber end alignment regardless of how many fibers are accommodated into the connector.

SUMMARY OF THE INVENTION

Pursuant to the invention, an initial gross positioning of the lense-spheres of upper fiber holders with respect to their corresponding receiving grooves in the lower fiber holder, is achieved by using a positioning element, such as a glass or metal cylinder, laterally offset from but precisely located with respect to the fiber-containing grooves of the lower fiber holder. Two cylinders are employed on either side of the fiber-containing V-groove. To interact with the elements, lateral tapered sides are formed in the upper holders, which during movement of the connector halves, engage the cylinder or similar element.

If, on the approach during the connecting move, the upper and lower holders are modestly offset thereby possibly preventing the lense-sphere of the upper holder from finding its alignment V-groove in the lower holder, the tapered sides of the upper holder contact the positioning element. The resulting force "funnels" or urges the lense-sphere of the upper holder and the holder itself back toward the center of the receiving grooves of the lower holder. When the lense-sphere finds its groove, it slides down into it, coming to rest in the groove.

In its final position, the upper housing is free of contact with the positioning element, thereby avoiding possible interference by the element with the precision alignment of the fibers.

In accordance with another aspect of the invention, a tripod system of spherical supports, one leg of which is the lense-sphere of the upper fiber holder, retains the opposing groove surfaces of the lower and upper fiber holders in predetermined parallel planes, while at the same time preventing the lower and upper fiber holders from undergoing during usage any rotation within their respective plane, relative to one another. This result is critically important to maintaining true co-axial alignment of the mating fibers.

DESCRIPTION OF THE DRAWING

FIGS. 7-11 are top, side and end views of upper and lower holders showing additional structure furnishing the tripod stabilizing mechanisms.

DETAILED DESCRIPTION OF AN ILLUSTRATIVE EMBODIMENT

Figure 1:
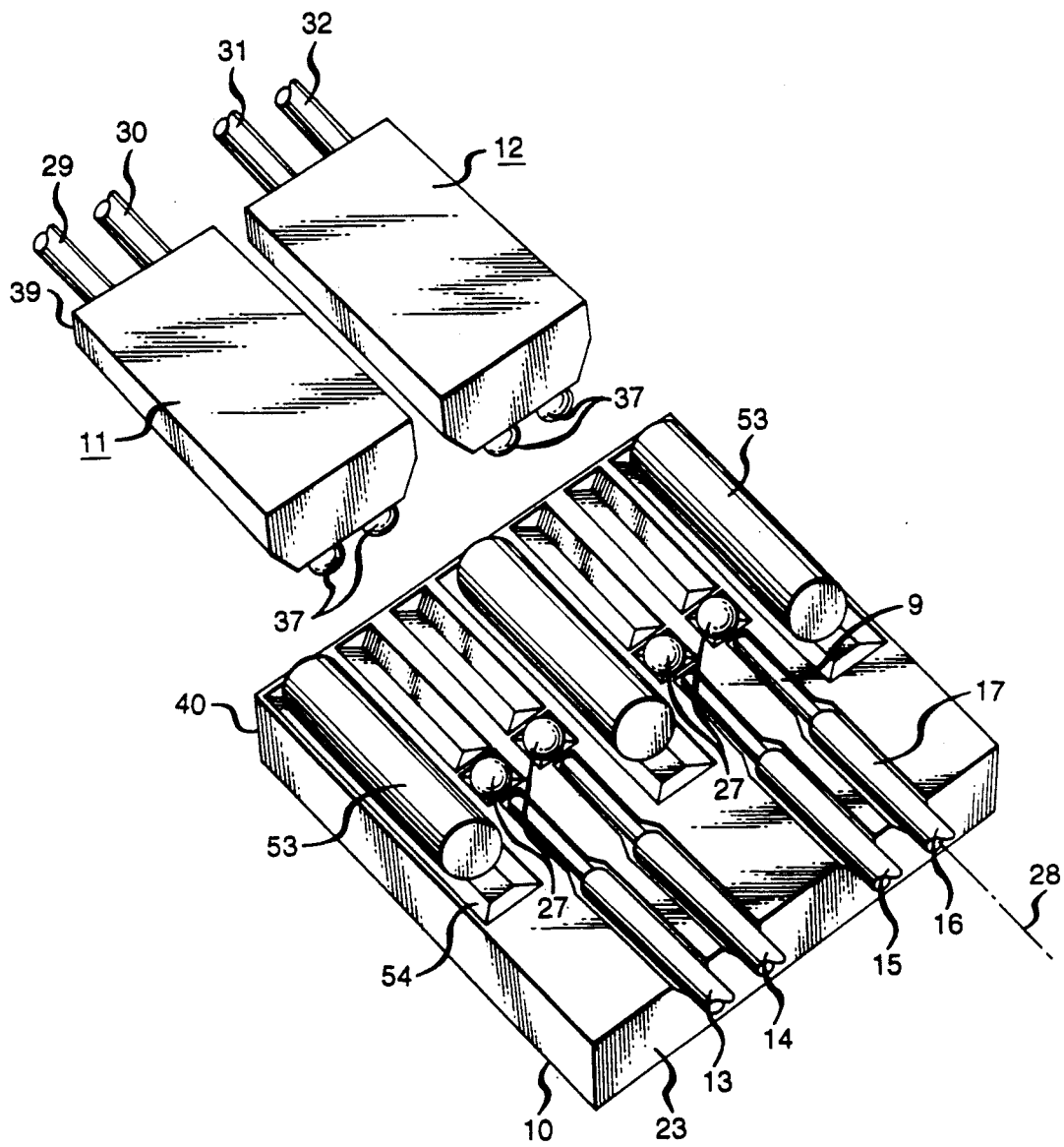
FIG. 1 is a perspective diagram of a lower and two upper fiber holders spaced in pre-mating relation.
Figure 2:
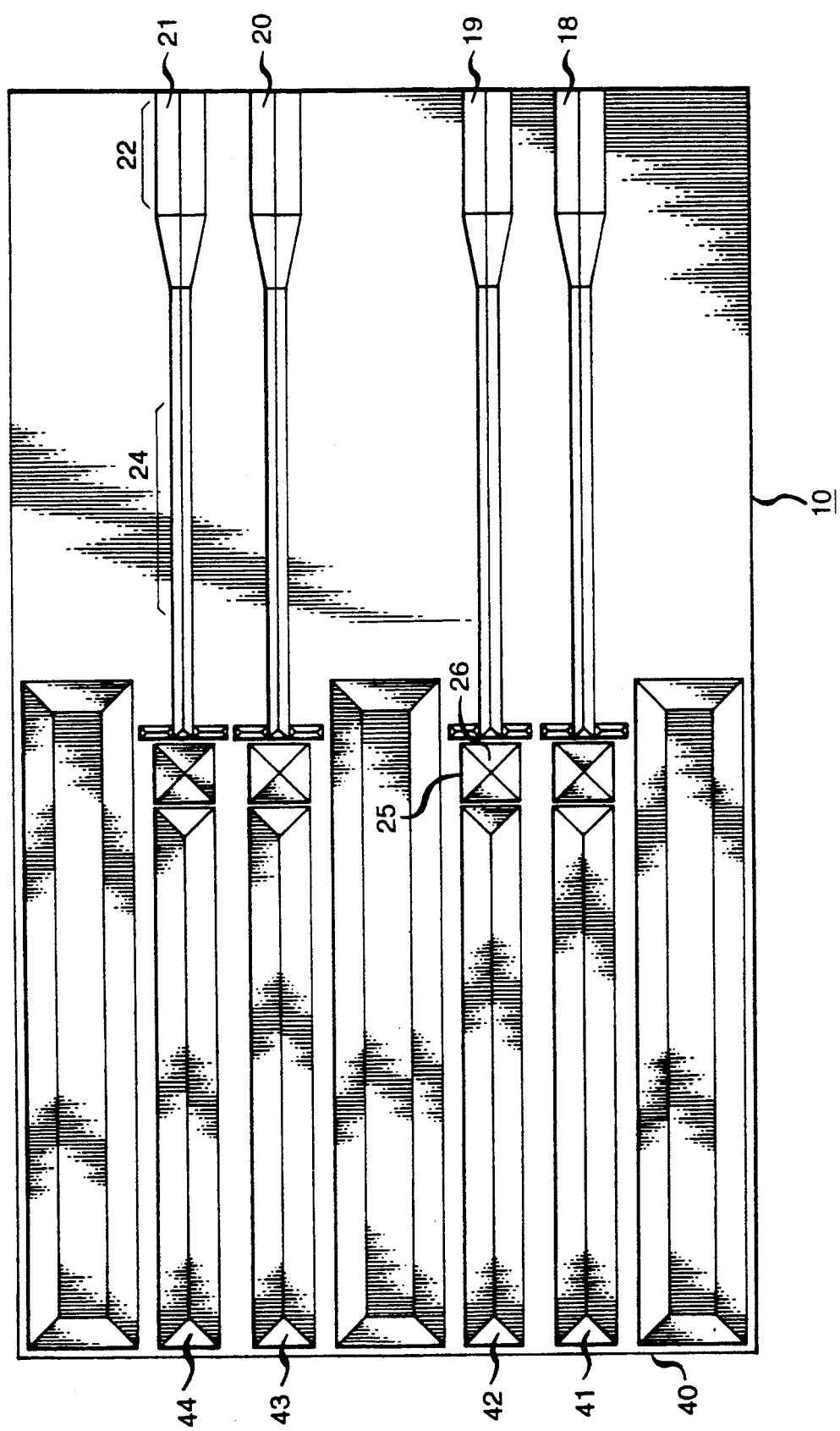
FIG. 2 is a top view of the lower fiber holder.

Referring to FIG. 1, there is shown a lower fiber holder 10 and a pair of upper fiber holders 11, 12 in their relative positions prior to engagement. As seen in FIG. 2, lower fiber holder 10 has four fiber-receiving grooves 18-21. The sides of the grooves 18-21 are V-shaped. Each such groove is formed as an exterior segment 22 which begins at the edge 23 of the holder 10 and receives the jacketed part of the fiber end. A communicating interior segment 24 of the grooves 18-21 receives the stripped, unjacketed fiber end 27.

Figure 3:
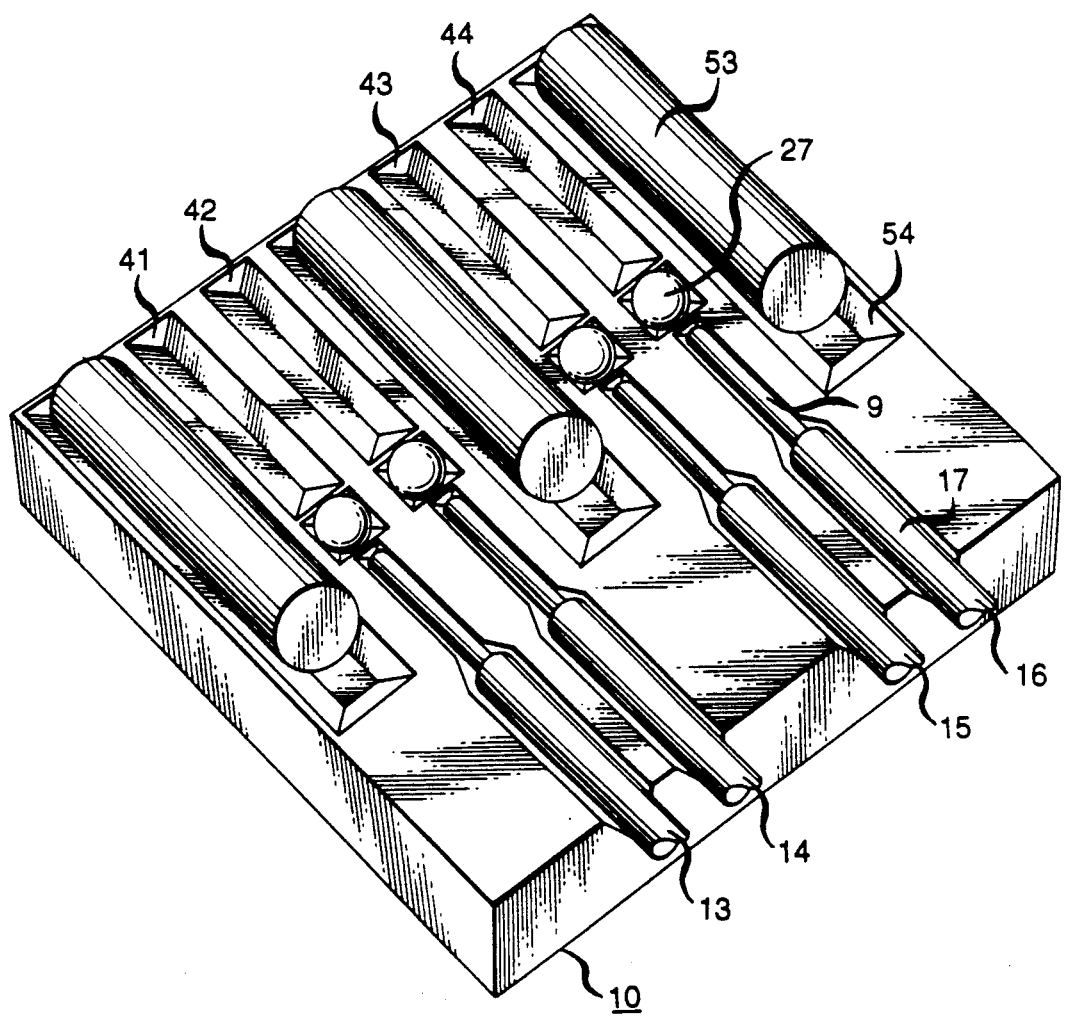
FIG. 3 is a perspective view of the lower fiber holder showing a first set of optical fibers and glass alignment cylinders installed in V-grooves.

FIG. 3 shows lower holder 10 with four optical fibers 13-16 disposed in the grooves 18-21. Each fiber has jacketing 17. The jacketing is removed from the end portion 9 of each fiber. The jacketed part resides in the exterior segments, and the stripped fiber end resides in the interior segment 24 of the grooves 18-21.

As best seen in FIG. 2, adjacent to the interior ends 24 of each respective fiber groove, there is formed in the lower fiber holder a well 25. Each well 25 is configured as an inverse pyramid with a square base and four tapered sides denoted 26. Each well 25 receives a lensesphere, such as the four spheres shown in FIG. 1. Each sphere 27 is precisely controlled in diameter to within ±2 inches, and is sized to lodge in its well 25 so that, with the unjacketed fiber end portion 9 resting in its interior segment 24, the fiber's center axis 28 extends substantially through the geometric center of the sphere 26.

Figure 4:
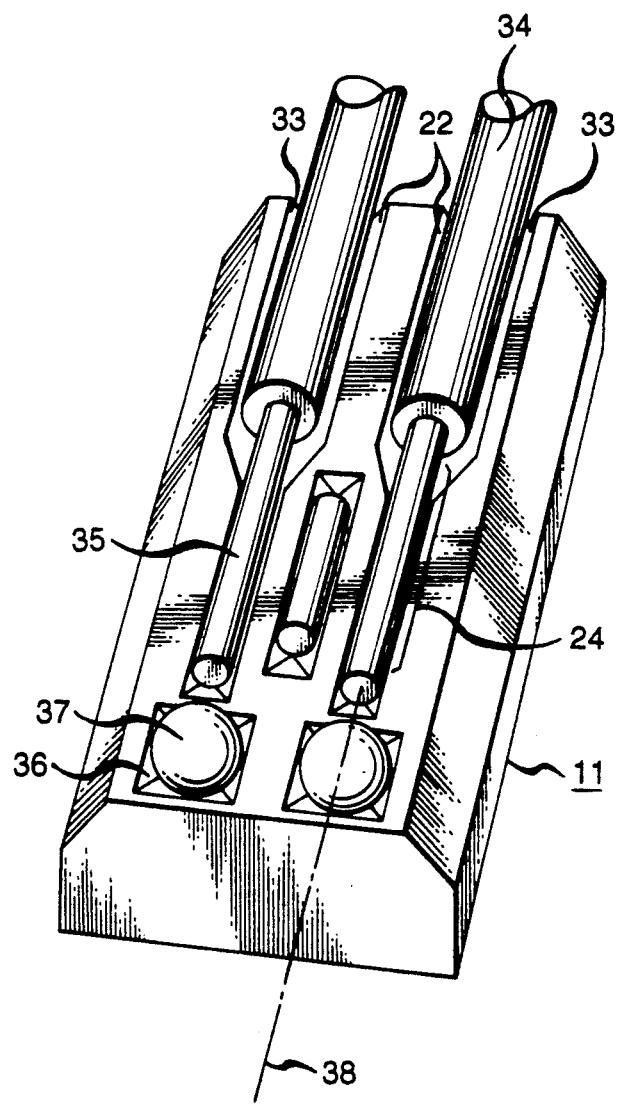
FIG. 4 is a perspective view of an upper fiber holder.

Four optical fibers 29-32, seen in FIG. 1, which are to be optically connected the fibers 13-17, are mounted in grooves 33 formed longitudinally on the underside of upper fiber holders 11, 12. As shown in FIG. 4, each groove 33 is shaped similarly to the grooves 18-21 in lower housing 10, in that each groove 33 has an exterior segment 22 which receives the jacketed part 34 of a fiber end and a communicating interior segment 24 which receives the stripped, unjacketed fiber end 35.

Adjacent to the interior end 24 of each respective fiber groove 33 in upper housings 11, 12 there is formed a well 36. Each well 36 has the described inverse pyramid, square based shape with four tapered sides, similar to the well 25 of lower housing 10. Each well 36 is located just inboard of the end 39 of holder 11, 12. Each well 36 receives a lense-sphere such as sphere 37, which is sized to lodge in its well 25 so that, with the unjacketed fiber end 35 resting in its interior groove segment 24, the fiber's center axis 38 extends substantially through the geometric center of the sphere 37.

Returning now to the description of lower fiber holder 10, as seen in FIG. 2, just inboard of the edge 40, there are formed four V-shaped alignment grooves 41-44. The bottom of the "V" of the grooves 41-44 are in alignment with the "V" bottoms of the groove segments 24 and 22. That is, the aligned "V" bottoms are contained in four specifically chosen parallel planes perpendicular to the surface of holder 10.

Further referring to FIG. 2, in the present embodiment each groove 41-44 extends inwardly on the surface of holder 10 to a point closely adjacent to the corresponding well 25. As illustrated here, the sphere-containing wells 25 are structurally distinct from the adjacent grooves 41-44. In other embodiments, the function of the well may be provided by allocating the end section of the grooves 41-44 to receive the spheres 27.

Figure 5A:
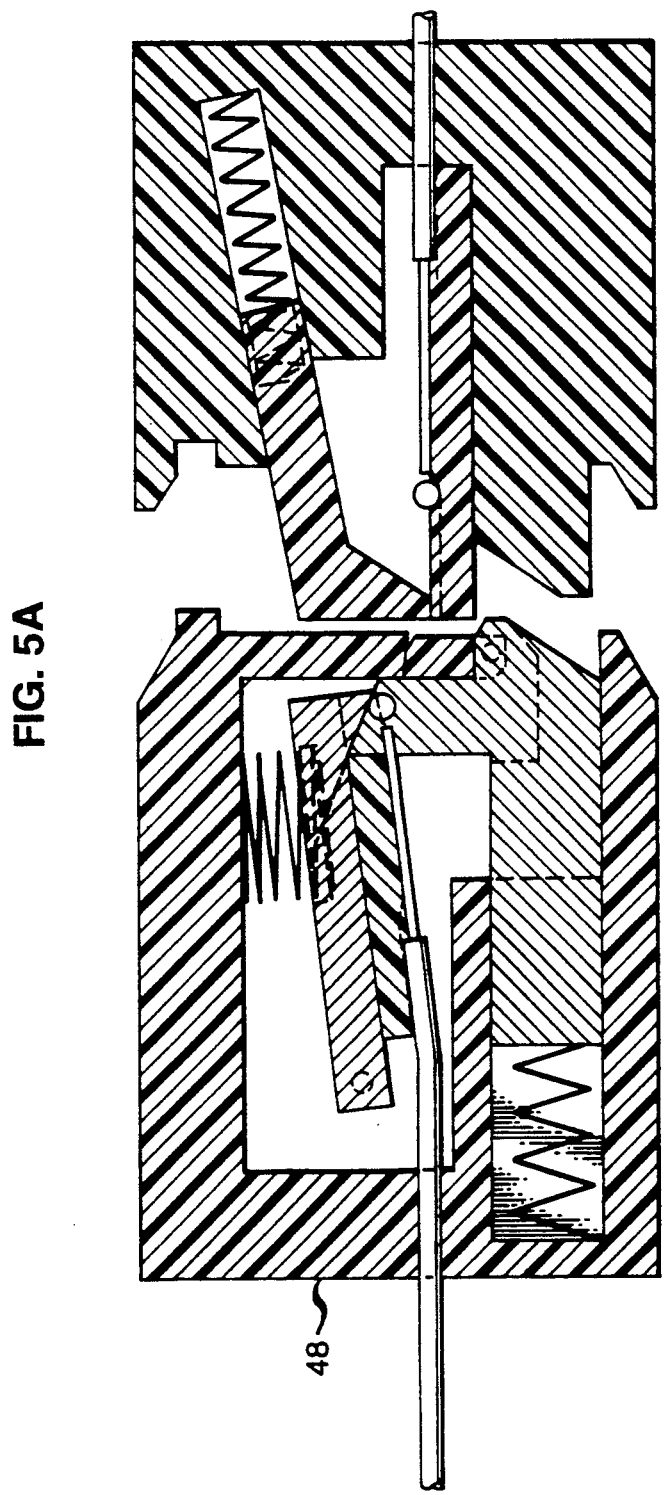
FIGS. 5A & 5B are a schematic side sectional view of two mating housings which may be used with the invention.
Figure 5B:
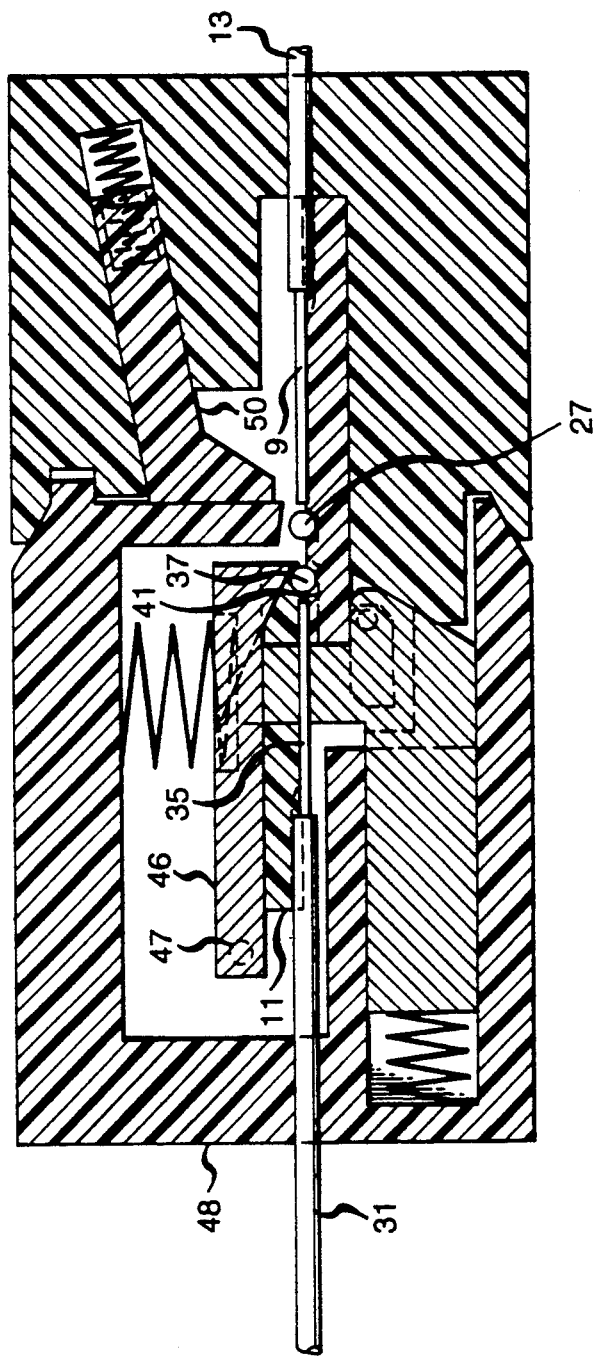

The alignment grooves 41-44 serve the function of receiving the respective spheres 37 as the upper fiber holders 11, 12 are moved down and into engaging relation with lower holder 10. This concept is generically illustrated in FIG. 1, by the arrow 45. In a particular embodiment of the invention as applied to the sealed connector art, shown in FIG. 5, the upper platform 11 may be fastened to an arm 46, which in turn is mounted on a pivot pin 47. Pin 47 is held in the side walls of the left housing 48. FIG. 5 shows the sphere 37 resting in a lower housing alignment groove such as 41, adjacent to the sphere 27, in the engaged position. The other mechanisms illustrated in FIG. 5, such as right housing 49, and slider 50, are fully described in the cited copending patent application which to the extent relevant is hereby incorporated by reference.

One aspect of the instant invention is a novel rough or gross positioning of the spheres 37 of upper fiber holders 11, 12 with respect to their corresponding receiving grooves 41-44 in the lower fiber holder 10, which will now be described. As seen in the schematic illustration of FIG. 6, the upper holders 11, 12 are formed with lateral sides 51 which have tapered or beveled surfaces 52 joining the sides 51 with the groove-containing surface. The tapered surfaces 52 are provided to contact a positioning element thereby to "funnel" or urge the spheres 37 and the upper holders 11, 12 which support them, toward the center of the receiving grooves such as groove 41 of lower holder 10. The positioning element 53 may, for example, be a glass or metal cylinder.

The tapered walls 55 of groove 54 are precisely (i.e., to within ½ micron) located with respect to the bottom of groove 41. Likewise, the tapered walls 55 of the cylinder-containing groove 56 are precisely located with respect to the bottom of groove 42 and of groove 43. The tapered walls 55 of groove 58 are precisely located with respect to the bottom of groove 44. The holding of these distances to a high degree of precision is readily achievable using silicon-etching processes. The holders 10, 11, 12 are substantially the only high-precision component needed to realize the invention.

Figure 6:
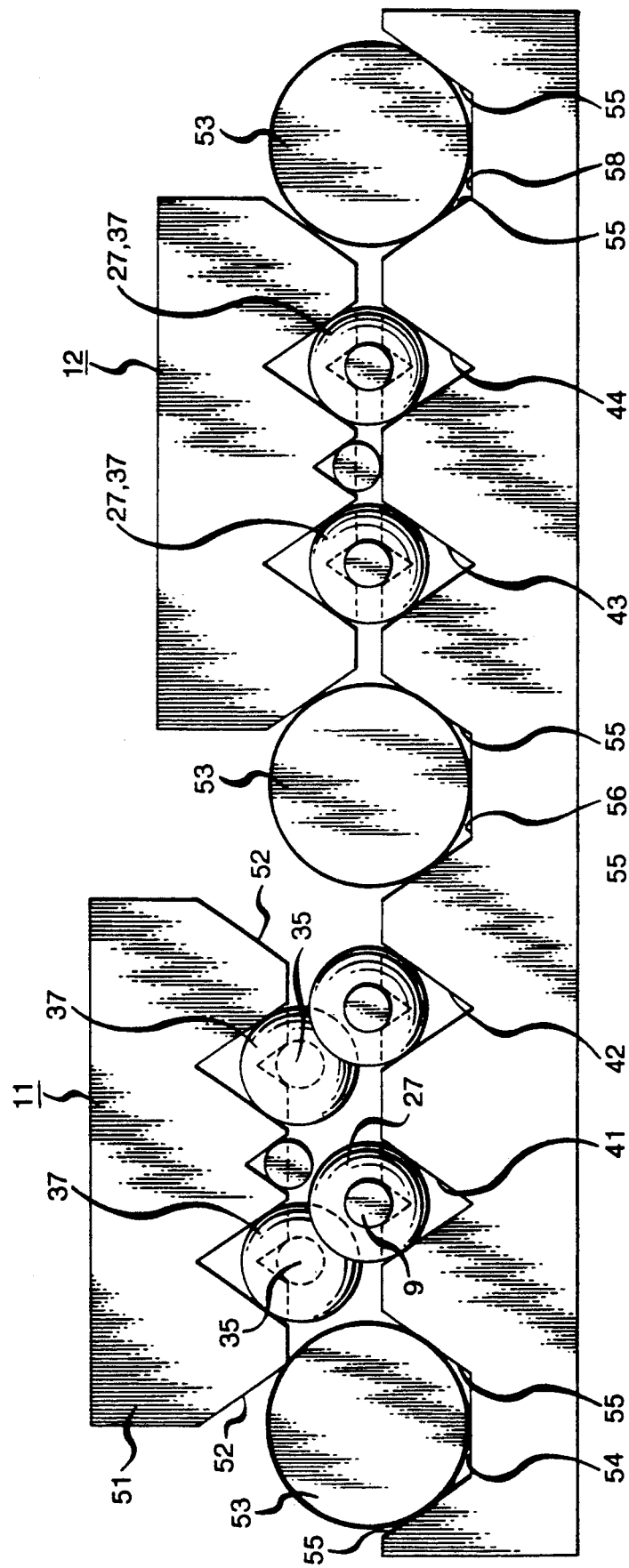
FIG. 6 is a schematic sectional view of the upper and lower holders during engagement.

The left side of FIG. 6 shows holder 11 being directed downwardly in an offset condition of, for example, a 6 mil off-center factor. The offset might, for example, be due to the low tolerances permitted to be maintained elsewhere in the structure such as in the housings and pivot pin of FIG. 5.

If it were not for the presence of cylinder 53, it is seen in FIG. 6 that as upper housing 11 descends downwardly, sphere 37 would contact surface portion 56 of lower housing 10 and stall there instead of entering the desired groove 41.

To avoid that result, in accordance with the invention, the left tapered surface 52, as it descends, contacts the side of cylinder 53. As upper holder 11 continues to descend toward lower holder 10, the tapered side 52 slides along the side of cylinder 53. Housing 11 and its alignment sphere 37 are thus urged to the right and toward a position where the sphere 37 is funnelled into its receiving groove 41.

Then, as the upper holder 11 continues downwardly, the spherical alignment lense 37 contacts the left tapered side of the alignment groove 41 and proceeds to slide downwardly into the groove. The upper holder 11 and its optical fibers 35 comes to rest with the fiber axes substantially coinciding. In this position, as seen in the right half of FIG. 6, the lense-spheres 27 and 37 are in alignment, and the ends of the fibers 9 and 35 are in coaxial alignment.

As earlier noted, achieving precision in the end-to-end connection of one or more pairs of optical fibers is a generic problem. The described basic invention effectively provides highly accurate, reliable fiber end alignment which can be constructed inexpensively and utilized in a variety of connector housings.

In accordance with another aspect of the invention, still higher precision is achieved by providing a three-point tripod system on which the upper housing 11 or 12 stands when housing 11 in fully descended onto lower housing 10.

The tripod system now to be described robustly retains the opposing groove surfaces of the lower and upper fiber holders in predetermined parallel planes. Further, the tripod structure acts to prevent any relative angular rotation or movement of the opposing surfaces of lower holder 10 and upper holder 11 within their respective planes. Preventing angular rotation of the type noted assures that the connected optical fibers will be maintained in precise, co-axial relation. This aspect of the invention is particularly suited to the connection of single-mode fibers, which require extremely high precision axial alignment.

Figure 7:
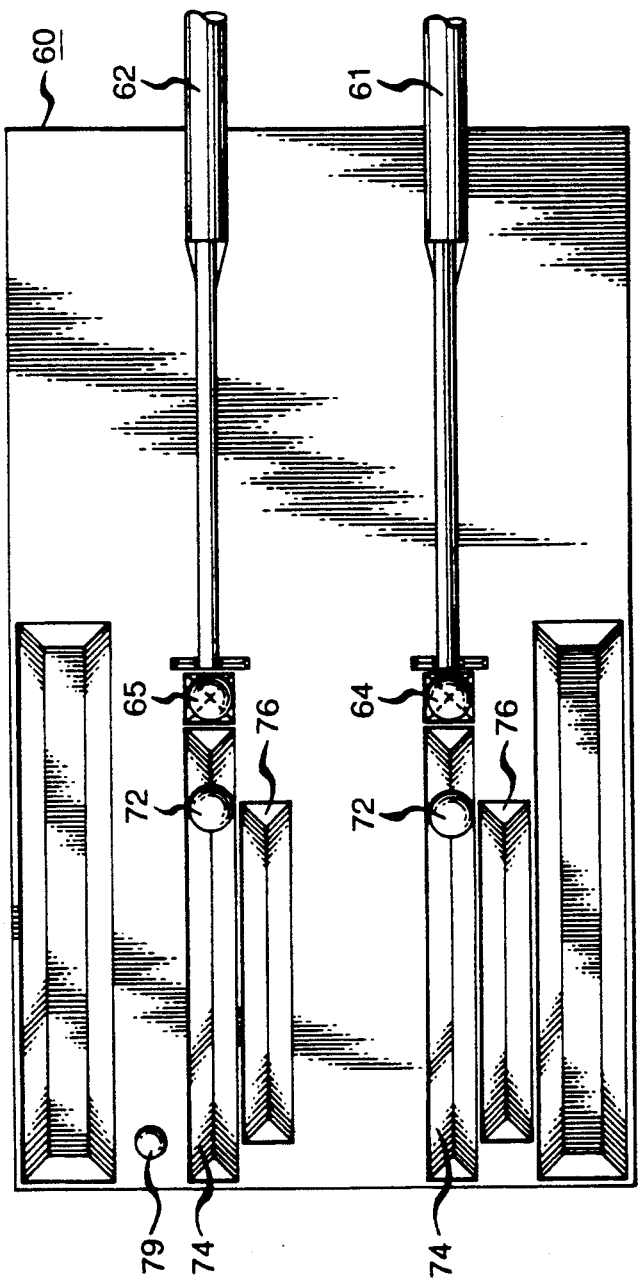

FIGS. 7–11 illustrate the tripod system of the invention. FIGS. 7 and 9 show a form of lower fiber holder 60 containing two fibers 61, 62 disposed in two V-grooves 63 which have interior and exterior segments as earlier described. Spheres 64 and 65 are disposed in wells 66. Alignment grooves are provided to receive the spheres 71, 72 associated with fibers 68, 69 when the upper and lower holders are brought together.

FIGS. 10 and 11 show two upper fiber holders with fibers 68, 69 disposed in respective V-grooves 70. The fiber ends are held adjacent to spheres 71, 72 which are fixed in their respective wells 73. It is understood that the lower holder and the two upper fiber holders are adapted to be moved into fiber-connecting position in the manner already described, for example, in connection with the structure shown in FIG. 5.

The objective of this aspect of the invention is to bring the upper fiber holders 66, 67 into position on the surface of the lower fiber holder 60 as depicted in FIG. 9, with the mating fibers in close coaxial alignment and the two V-groove surfaces being precisely and stably spaced by a three-point supporting structure for each upper holder 66, 67.

The inventive tripod structure supporting upper holder 67 is illustrative. The first leg of the tripod structure, in accordance with this aspect of the invention, is the lense-sphere 72, seen in FIGS. 9 and 10. As seen in FIG. 9, lense-sphere 72 comes to rest in one of the alignment grooves 74, in roughly the position depicted by the circle denoted 72 in FIG. 7.

The second leg of the tripod is a second sphere 75, seen in FIGS. 9 and 10. Sphere 75 is fixed in a well 76 located at a position offset from, i.e., to the side of, the V-groove in holder 67 which contains the fiber 68. When the upper holder 67 approaches lower holder 60, second sphere 75 finds a neutral position in a V-groove 76 located to one side of, and parallel to, the fiber V-groove 74 in holder 60 as seen in FIG. 7.

The third leg of the tripod support is a third sphere 77, fixed in a relatively deep well 78 formed in upper housing 67 on the side of the fiber V-groove opposite to that on which the well 76 containing second sphere 75 is formed. Third sphere 77 rests on the surface of lower holder 60 in a flat, ungrooved section thereof denoted 79 in FIG. 7.

The top view afforded by FIG. 10 shows that the first, second and third spheres 72, 75, 77 comprise a stabilizing tripod. The first and second spheres 72, 75 are captured in parallel grooves. Accordingly, while spheres 72, 75 can move somewhat in the grooves in a direction toward or away from the mating fibers contained in lower holder 60, the first and second spheres 72, 75 constrain the upper holder 66 or 67 from rotating.

The third sphere 77, since it is not contained in a groove or well, is theoretically free to move. However, it can only move in the direction described for the first and second spheres. The presence of third sphere 77, however, prevents tipping or pivoting of the upper holder which would occur if only two spheres were employed.

Although three support legs are described, the invention may be practiced with more than three supports, for example, four supports. The basic idea is that the support points according to the invention substantially establish the plane in which the opposing fiber axes lie; and at the same time, all but eliminate the possibility of significant relative rotation of the lower holders with respect to the upper holders.

Figure 8:
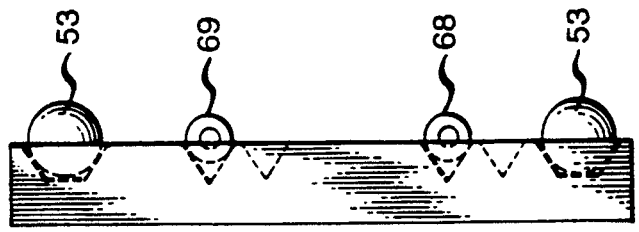

The positioning elements 53 and the tapered side walls of holder 67, earlier described, are incorporated into the present embodiment, as seen in FIGS. 8 and 11.

In practice, light spring force (not shown) may be supplied to urge the lower and upper holders 67, 60 into engaging relation and will be sufficient together with the tripod spacing just described to maintain the fibers in precision axial alignment.

In all embodiments described above, it is not critical that the lense-spheres be maintained separate by any particular distance, because the light beams between the two are parallel and will not appreciable diffuse over slight distances. In fact, it is necessary to provide some spacing between the two lense-spheres since with separation, transmission-degrading particulate dust has less of a chance to become squeezed between the spheres, as would be the case for conventional butt couplings.

The lense-spheres may be formed of sapphire or of another material such as ZIRCON. The lower and upper fiber holders advantageously are formed of silicon using conventional photoresist-etch-saw technology which enables very precise positioning of the wells and grooves. All of the precision needed to assure precise alignment of the fiber ends may be achieved by building in precision to the fiber holders.

I claim:

1. Apparatus for connecting two sets of optical fibers comprising:

mating lower and upper fiber holders, each holder comprising one or more parallel, V-grooves formed on a holder surface, the opposing grooves being congruent;

each groove comprising a relatively deep exterior segment for receiving jacketed fiber and an interior segment for receiving unjacketed fiber;

means adjacent to the end of each said V-groove interior segment for receiving a lense-sphere;

a lense-sphere disposed in each said receiving means, the center of said lense-sphere being disposed at the center axis of the adjacent fiber;

the lateral sides of said upper fiber holders being formed with a bevel; and a positioning element disposed to one side of each fiber-containing groove of said lower fiber holder, and extending upwardly from said V-groove surface;

whereby, as said lower and upper holders move together in mating relation, said lateral tapered sides of said upper holders engage said positioning element, thereby moving the corresponding said lense-sphere of said upper holder into the associated lense-sphere receiving groove of said lower holder.

2. Apparatus in accordance with claim 1, wherein said lense-sphere receiving means comprises a well formed adjacent to the end of each said V-groove interior segment.

3. Apparatus in accordance with claim 2, wherein said lower holder further comprises an elongate cavity formed parallel to each fiber-receiving V-groove, and wherein said positioning element comprises a cylindrical glass member disposed in said cavity.

4. Apparatus in accordance with claim 3, further comprising:
means for pivotally mounting the exterior end of said upper holder above said lower holder; and
means responsive to movement of said holders toward each other for moving the lense-sphere of said upper holders down toward their respective receiving grooves in said lower holder.

5. Apparatus in accordance with claim 4, wherein said upper and lower fiber holders are fabricated on a silicon substrate, and wherein said V-grooves are formed by precision etching of a surface of said substrate.

6. Apparatus in accordance with claim 5, wherein said pivot mount of said upper holder comprises means for laterally positioning said upper holder in response to contact of a tapered side of said holder with said positioning element.

7. Apparatus for connecting two sets of optical fibers, comprising:
mating lower and upper fiber holders, each holder comprising one or more parallel, congruent V-grooves formed on a holder surface;
means adjacent to the end of each said V-groove for receiving a lense-sphere;
a lense-sphere fixedly mounted in each said receiving means, the center of said lense-sphere intersected by the center axis of the adjacent fiber;
the lateral sides of said upper fiber holders being formed with a bevel; and
a positioning element disposed to one side of each fiber-containing groove of said lower fiber holder, and extending upwardly from said V-groove surface;
said element contacting said beveled side during said mating and urging said upper holder into alignment with said lower holder.

8. Apparatus in accordance with claims 1 or 7, further comprising:
a left housing pivotally mounting one or more of said upper fiber holders; and
a right housing fixedly mounting said lower fiber holder on an interior floor thereof with said lower holder's V-grooves facing the corresponding V-grooves of said upper housings.

9. Apparatus in accordance with claims 1 or 7, further comprising:
support means disposed between each said upper holder and said lower holder, for maintaining the respective fiber groove-containing surfaces substantially parallel to each other when said upper and lower holders are engaged to optically connect fibers; and
means for rotationally restraining said support means, thereby preventing said upper holders from rotating in their plane of containment with respect to said lower holder.

10. Apparatus in accordance with claim 9, wherein said support means comprises:
a first leg comprising the lense-sphere of said upper holder;
a second leg comprising a second sphere fixed in a well offset to one side of an upper holder V-groove;
a third leg comprising a third sphere fixed in a well offset to the opposite side of said upper holder V-groove, said third sphere resting on a flat, ungrooved section of said lower holder; and
wherein said rotational restraining means comprises:
the upper holder V-groove containing said lense-sphere; and
a V-groove formed parallel to said lower holder V-groove for receiving said second sphere.

* * * * *